United States Patent
Miyama et al.

(10) Patent No.: US 11,114,968 B2
(45) Date of Patent: Sep. 7, 2021

(54) ROTATING ELECTRIC MACHINE DEVICE AND ROTATING ELECTRIC MACHINE DEVICE CONTROL METHOD

(71) Applicant: Mitsubishi Electric Corporation, Tokyo (JP)

(72) Inventors: Yoshihiro Miyama, Tokyo (JP); Hideaki Arita, Tokyo (JP); Junji Hori, Tokyo (JP); Tomohira Takahashi, Tokyo (JP); Kenzo Makino, Tokyo (JP); Masaya Inoue, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/753,675

(22) PCT Filed: Nov. 24, 2017

(86) PCT No.: PCT/JP2017/042247
§ 371 (c)(1),
(2) Date: Apr. 3, 2020

(87) PCT Pub. No.: WO2019/102591
PCT Pub. Date: May 31, 2019

(65) Prior Publication Data
US 2020/0295694 A1    Sep. 17, 2020

(51) Int. Cl.
*H02P 27/06* (2006.01)
*G01K 1/024* (2021.01)
*G01K 7/32* (2006.01)
*H02P 29/024* (2016.01)

(52) U.S. Cl.
CPC .............. *H02P 27/06* (2013.01); *G01K 1/024* (2013.01); *G01K 7/32* (2013.01); *H02P 29/024* (2013.01)

(58) Field of Classification Search
CPC .......... G01K 7/32; G01K 17/00; G01K 7/346; G01K 1/024; H03J 3/04; H03J 3/20;
(Continued)

(56) References Cited

U.S. PATENT DOCUMENTS 6,035,265 A * 3/2000 Dister ................. G01R 31/343
324/765.01
6,041,287 A * 3/2000 Dister ................. B60L 3/0023
702/182
(Continued)

FOREIGN PATENT DOCUMENTS

JP    3833162 B2    10/2006
JP    5037755 B2    10/2012
(Continued)

OTHER PUBLICATIONS

International Search Report of PCT/JP2017/042247 dated Feb. 13, 2018 [PCT/ISA/210].

*Primary Examiner* — Antony M Paul
(74) *Attorney, Agent, or Firm* — Sughrue Mion, PLLC; Richard C. Turner

(57) ABSTRACT

A rotating electric machine apparatus including: a rotating electric machine (REM) including a rotor and a stator; an inverter device including an inverter circuit (IC) for driving the REM and an inverter control unit (ICU) for controlling the IC; a detector, in which a first antenna is connected to a resonance circuitry, which is mounted to the REM and has a resonance characteristic that changes depending on a change in a physical quantity; and a detection processor receiving a response radio wave indicating a detection result of the change in the physical quantity from the first antenna while transmitting a transmission radio wave at a set carrier frequency from a second antenna, and comparing the detection result and the set value, to thereby obtain an abnormal
(Continued)

state in the REM. The ICU controls output of the IC in accordance with an abnormal state signal from the detection processor.

20 Claims, 9 Drawing Sheets

(58) Field of Classification Search
CPC ...... H03J 3/22; H03J 2200/07; H03J 2200/19; G01P 5/10; G01P 13/006; H02P 1/00; H02P 1/04; H02P 1/20; H02P 1/18; H02P 1/26; H02P 27/06; H02P 27/04; H02P 1/42; H02P 1/46; H02P 1/465; H02P 9/107; H02P 21/00; H02P 27/00; H02P 23/00; H02P 29/024
USPC .......................................................... 318/471
See application file for complete search history.

(56) References Cited

U.S. PATENT DOCUMENTS

| | | | | |
|---|---|---|---|---|
| 6,295,510 B1* | 9/2001 | Discenzo | ................... | H02P 9/02 310/50 |
| 6,483,319 B1* | 11/2002 | Kendig | ................ | G01R 31/343 324/551 |
| 7,615,951 B2* | 11/2009 | Son | ........................ | H02P 29/64 318/432 |
| 8,421,391 B2* | 4/2013 | Yeh | ......................... | H02K 11/20 318/432 |
| 8,487,575 B2* | 7/2013 | Yeh | ........................... | H02P 6/08 318/471 |
| 8,547,045 B2* | 10/2013 | Wu | ......................... | H02P 7/285 318/432 |
| 9,337,707 B2* | 5/2016 | Dixon | .................... | H02K 11/33 |
| 9,438,145 B2* | 9/2016 | Reigosa | .................. | H02P 23/14 |
| 9,438,146 B2* | 9/2016 | Celik | ........................ | H02P 6/15 |
| 9,735,654 B2* | 8/2017 | Stridsberg | ................ | H02K 1/32 |
| 10,018,518 B2* | 7/2018 | Takamizawa | .......... | G01K 1/026 |
| 2013/0003779 A1* | 1/2013 | Fukuda | .................. | G01K 1/024 374/117 |

FOREIGN PATENT DOCUMENTS

| | | |
|---|---|---|
| JP | 2013-169144 A | 8/2013 |
| JP | 2015-133890 A | 7/2015 |
| WO | 2011/081102 A1 | 7/2011 |

* cited by examiner

ROTATING ELECTRIC MACHINE DEVICE AND ROTATING ELECTRIC MACHINE DEVICE CONTROL METHOD

CROSS REFERENCE TO RELATED APPLICATIONS

This application is a National Stage of International Application No. PCT/JP2017/042247, filed Nov. 24, 2017.

TECHNICAL FIELD

The present invention relates to a rotating electric machine apparatus and a control method for a rotating electric machine. In particular, the present invention relates to a rotating electric machine apparatus and a control method for a rotating electric machine apparatus for executing drive control by using a physical quantity detection apparatus configured to use a resonance circuit unit having a resonance characteristic that changes depending on a change in physical quantity, so as to transmit and receive a radio wave through antennas to and from the resonance circuit unit, to thereby remotely detect a change in the physical quantity of an object to be measured.

BACKGROUND ART

In a rotating machine including a movable portion or a high-voltage portion, it has been difficult to detect a physical quantity on the movable side or the high-voltage side in a non-contact manner. As means for detecting a physical quantity, there has hitherto been a measurement apparatus configured to use a crystal oscillator so as to detect a temperature with a configuration including a resonance circuit (for example, see Patent Literature 1). Moreover, as means for detecting a temperature in a non-contact manner, there has been proposed an apparatus including an oscillator and a receiver (for example, see Patent Literature 2). Further, there has also been proposed an apparatus including a wireless measurement apparatus and a sensor unit (for example, see Patent Literature 3).

Meanwhile, there has been proposed an apparatus configured to estimate a temperature with a focus on a permanent magnet formed in a part of a rotating electric machine (for example, see Patent Literature 4). In Patent Literature 4, for example, a voltage or a current having a frequency different from a frequency of a fundamental wave for driving a synchronous motor is superposed on a d-axis of the synchronous motor. Then, in the Patent Literature 4, the impedance of the synchronous motor is calculated from the superposed voltage or current, and a current or a voltage obtained as a result of the superposition, and the temperature of the permanent magnet is estimated based on the calculated impedance.

CITATION LIST

Patent Literature

[PTL 1] JP 5037755 B2
[PTL 2] JP 3833162 B2
[PTL 3] WO 2011/081102 A1
[PTL 4] JP 2015-133890 A

SUMMARY OF INVENTION

Technical Problem

However, the related art has the following problems.

In Patent Literature 1, remote measurement is not considered. In Patent Literature 2, it is required to switch between the oscillator and the receiver, and hence time for communication is required. Therefore, Patent Literature 2 is not suitable for detection of a physical quantity of a movable portion.

Moreover, in Patent Literature 3, a frequency sweep is executed to acquire data when a reflected power intensity is measured through a wireless measurement apparatus. Therefore, in Patent Literature 3, time is required for the frequency sweep, and it is thus difficult to obtain a desired timing and a required signal level for a machine operating at high speed. Moreover, in Patent Literature 3, a large-scale apparatus configured to sweep the frequency is required.

Further, in such a related art as that in Patent Literature 4 configured not to directly measure the temperature, properties of a material other than a magnet that change depending on the temperature, variations of components in manufacturing, and the like cause detection errors. As a result, in Patent Literature 4, the measurement accuracy is decreased.

The present invention has been made in view of the above-mentioned problems, and therefore has an object to provide a rotating electric machine apparatus and a control method for a rotating electric machine apparatus for accurately detecting a change in a physical quantity of an object to be measured of a rotating electric machine including a movable portion or a high-voltage portion, and executing drive control in accordance with an obtained detection result.

Solution to Problem

According to one embodiment of the present invention, there is provided a rotating electric machine apparatus including: a rotating electric machine including a rotor and a stator provided concentrically about a rotation shaft as an axis, one of the rotor and the stator being provided outside another thereof, the rotor being rotatable about the rotating shaft as the axis, the stator being fixed, any one of the rotor and the stator including an armature, another thereof including a field; an inverter device including an inverter circuit configured to drive the rotating electric machine, and an inverter control unit configured to control the inverter circuit; a detection apparatus including a resonance circuit unit, which is mounted to an object to be measured of the rotating electric machine and has a resonance characteristic that changes depending on a change in a physical quantity of the object to be measured, and a first antenna configured to transmit the resonance characteristic; and a detection processing device configured to receive the resonance characteristic dependent on the change in the physical quantity in a form of a response radio wave from the first antenna as a response to a transmission radio wave transmitted from a second antenna, calculate a detection result corresponding to a current value of the physical quantity from the resonance characteristic, and compare whether the detection result is within a permissible range set in advance, to thereby detect whether the object to be measured is in an abnormal state, wherein the inverter control unit is configured to control output of the inverter circuit so that the detection result falls within the permissible range when the inverter control unit receives from the detection processing device an abnormal state signal indicating that the abnormal state is detected.

Advantageous Effects of Invention

In the present invention, the resonance circuit unit having the resonance characteristic that changes depending on the physical quantity is used, and the radio wave is transmitted to and from the resonance circuit unit through use of the antenna. Further, the response radio wave indicating the detection result is received while transmitting the transmission radio wave at the set carrier frequency, and the abnormal state including an overload state in the rotating electric machine is obtained by comparing the detection result and the set value with each other. Then, the rotating electric machine is controlled in accordance with the abnormal state. As a result, a limit of the physical quantity can be detected with a simple configuration so as to operate the current, to thereby be able to protect the rotating electric machine.

DESCRIPTION OF EMBODIMENTS

Now, a rotating electric machine apparatus and a control method for a rotating electric machine according to each of embodiments of the present invention are described with reference to the drawings. Note that, in each of the embodiments, the same or corresponding portions are denoted by the same reference symbols, and the overlapping description thereof is omitted.

First Embodiment

Figure 1:
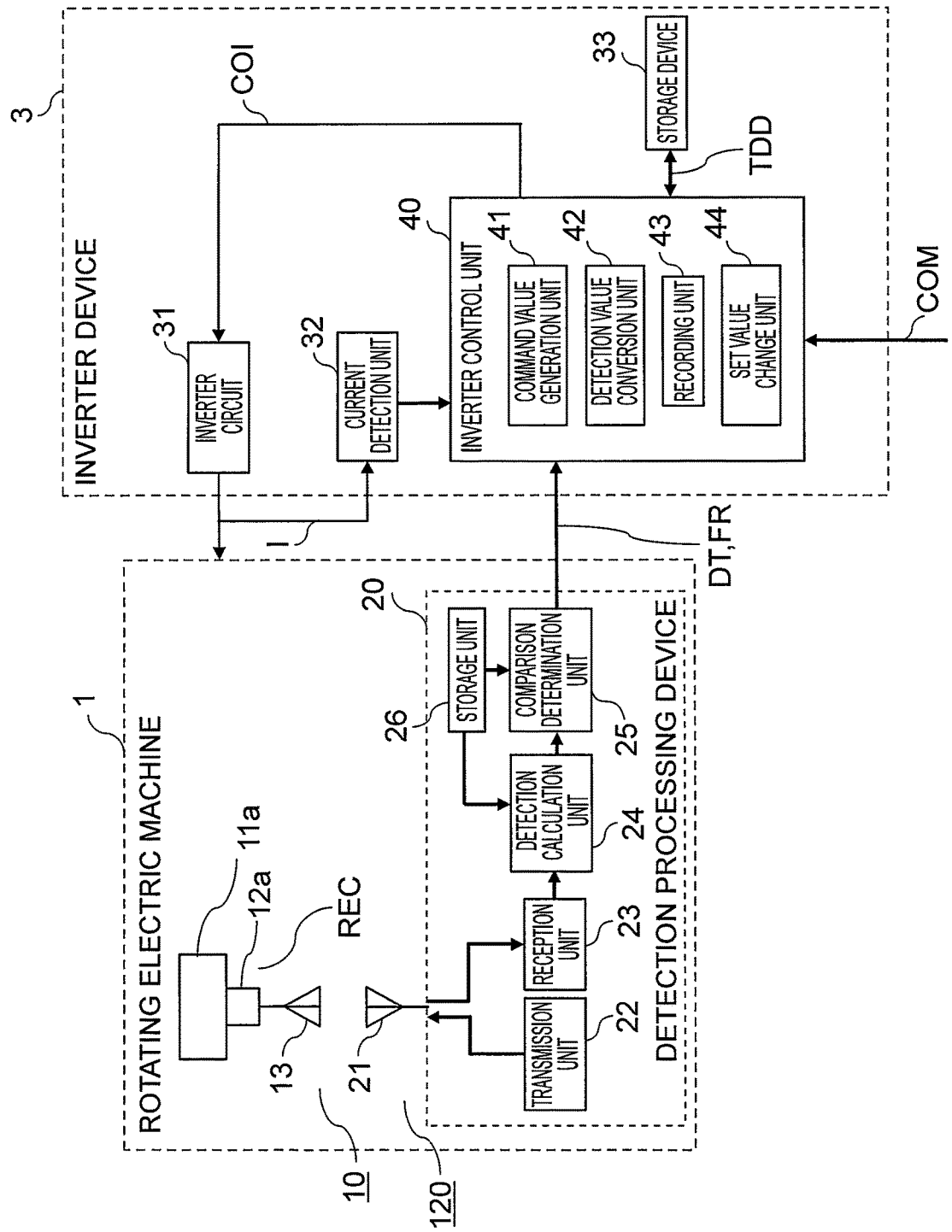
FIG. 1 is a block diagram for illustrating a schematic configuration of a rotating electric machine apparatus according to a first embodiment of the present invention.

FIG. 1 is a block diagram for illustrating a schematic configuration of a rotating electric machine apparatus according to a first embodiment of the present invention. The rotating electric machine apparatus roughly includes a rotating electric machine 1 and an inverter device 3. The rotating electric machine 1 includes a physical quantity detection apparatus 120 formed of a detection apparatus 10 and a detection processing device 20. The inverter device 3 includes an inverter circuit 31, an inverter control unit 40, a current detection unit 32, and a storage device 33. The detection processing device 20 may be provided outside the rotating electric machine 1. The storage device 33 may be provided outside the inverter device 3.

Figure 2:
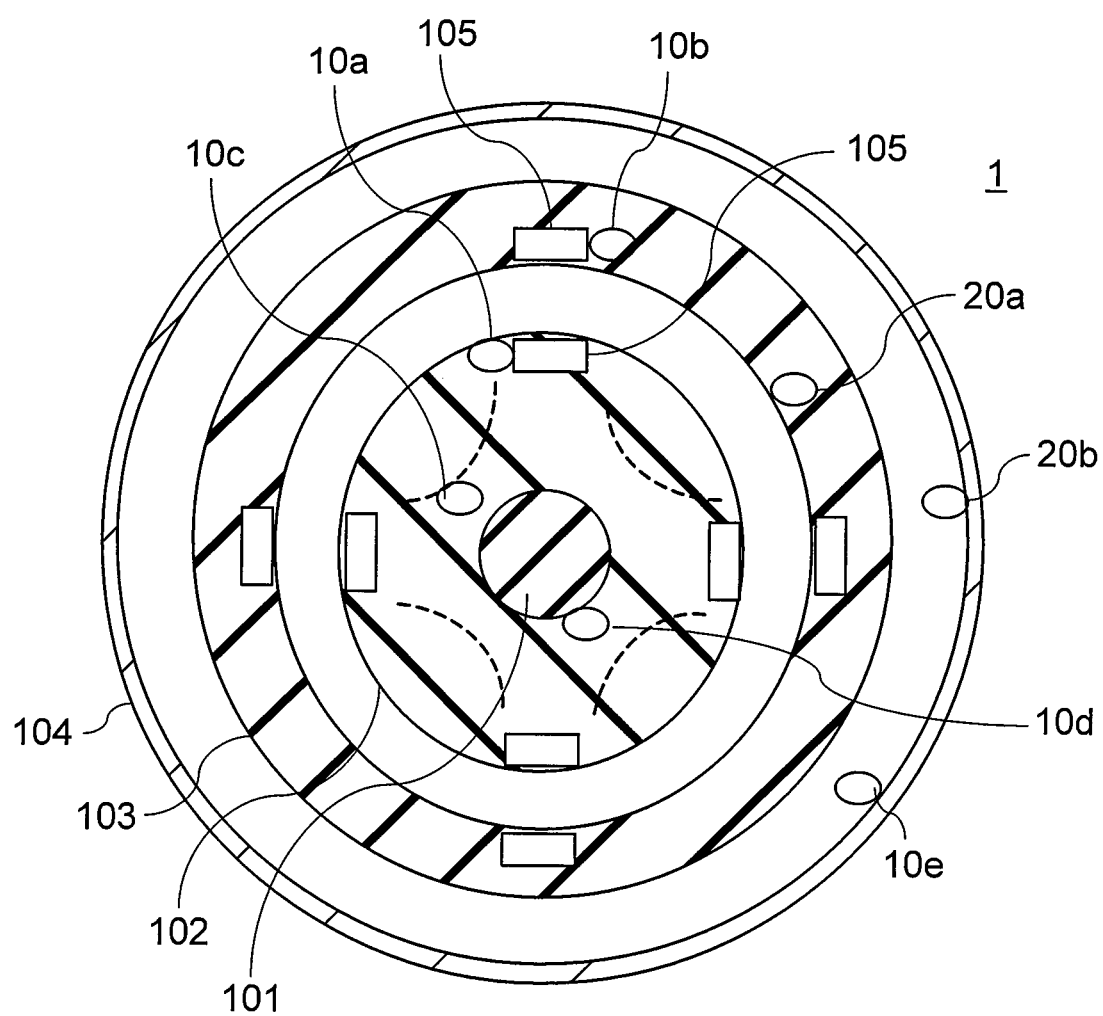
FIG. 2 is a sectional view for illustrating a schematic structure of a rotating electric machine.

FIG. 2 is a sectional view for illustrating a schematic structure of the rotating electric machine 1. The rotating electric machine 1 includes a rotation shaft 101, an inner cylindrical member 102, an outer cylindrical member 103, and a frame 104 of the rotating electric machine 1 from the inside in the stated order. The inner cylindrical member 102 and the outer cylindrical member 103 are provided concentrically about the rotation shaft 101 as an axis. Any one of the inner cylindrical member 102 and the outer cylindrical member 103 is a rotor rotatable about the rotation shaft 101 as the axis, and the other one is a stator fixed to the frame 104.

FIG. 2 is a diagram for illustrating a case in which the inner cylindrical member 102 is the rotor. When the inner cylindrical member 102 is the stator, not the rotation shaft 101, but a rotation shaft different from the rotation shaft 101 exists in the front and rear portions of FIG. 2. An armature is provided in any one of the rotor and the stator, and fields are provided in the other thereof. The armature and the fields arranged at positions separated from each other by a rotation angle of 90° are schematically indicated by reference numeral 105. Detection apparatus 10 indicated by reference numerals 10a to 10e are mounted to appropriate portions of the rotating electric machine 1 in order to detect a physical quantity such as a temperature, a strain, and a stress.

In FIG. 1, the detection apparatus 10 includes a detection device 12a mounted to an appropriate portion to be measured 11a of the rotating electric machine 1 and an first antenna 13. A resonance characteristic of the detection device 12a changes depending on a change in a physical quantity of the portion to be measured 11a. The detection device 12a is connected to the first antenna 13.

Meanwhile, the detection processing device 20 includes a second antenna 21, a transmission unit 22, a reception unit 23, a detection calculation unit 24, a comparison determination unit 22, and a storage unit 26.

The inverter control unit 40 included in the inverter device 3 includes a command value generation unit 41, a detection value conversion unit 42, a recording unit 43, and a set value change unit 44. The inverter control unit 40 is configured to execute switching control for the inverter circuit 31. The inverter device 3 additionally includes, for example, a current detection unit 32 and the storage device 33. The current detection unit 32 is configured to apply feedback control to a current from the inverter circuit 31. The storage device 33 is configured to store data indicating detected overload states in the rotating electric machine. The inverter control unit 40 usually executes drive control for the inverter circuit 31 in accordance with a drive command COM from the outside.

In the embodiment illustrated in FIG. 1, the rotating electric machine 1 is, for example, an interior permanent magnet synchronous motor, and the detection device is a crystal oscillator 12a. The crystal oscillator 12a is configured to measure a temperature of a magnet of the field in the rotor of the interior permanent magnet synchronous motor.

Moreover, the inverter control unit 40 executes derating and data storage in accordance with a result of the temperature measurement.

The crystal oscillator 12a internally includes a resonance circuit, and forms a resonance circuit unit REC. The crystal oscillator 12a is mounted to a surface of the magnet 11a of the field in the rotor of the interior permanent magnet synchronous motor, and this mounting position corresponds to a position indicated by reference numeral 10a of FIG. 2.

A resonance characteristic of the crystal oscillator 12a changes depending on a change in a temperature or a stress received from the magnet 11a. Thus, the detection apparatus 10 detects the change in the temperature or the stress in accordance with the change in the resonance characteristic of the crystal oscillator 12a. The crystal oscillator 12a is connected to and provided integrally with the first antenna 13, to thereby form the detection apparatus 10.

The detection processing device 20 is installed on the stator side. A position of this installation corresponds to, for example, a position indicated by reference numeral 20a or 20b of FIG. 2. The transmission unit 22 is configured to transmit a transmission radio wave at a set carrier frequency through the second antenna 21. The reception unit 23 is configured to receive a response radio wave, which indicates a detection result of the change in the physical quantity and is transmitted from the first antenna 13, in correspondence to this transmission through the second antenna 21.

The detection calculation unit 24 is configured to execute various types of detection and calculation as required, based on the response radio wave received by the reception unit 23. As an example, the detection calculation unit 24 obtains the frequency of the response radio wave. The comparison determination unit 25 is configured to compare the frequency of the response radio wave detected by the detection calculation unit 24 and a set frequency stored in advance in the storage unit 26.

The comparison determination unit 25 determines that the rotating electric machine 1 is in an abnormal state when the frequency indicating the temperature of the magnet 11a has become equal to or higher than the set frequency determined in advance. Then, the comparison determination unit 25 outputs a derating signal DT indicating that the rotating electric machine 1 is in an overload state to the inverter control unit 40 included in the inverter device 3. When the derating signal DT is input, the inverter control unit 40 changes a value of a current command COI so that an output current value I of the inverter circuit 31 detected by the current detection unit 32 is equal to or less than a limiting value.

The comparison determination unit 25 turns off the derating signal DT when the temperature of the magnet 11a decreases, and the frequency detected by the detection calculation unit 24 thus decreases to a frequency equal to or lower than a set frequency determined in advance.

The comparison determination unit 25 also outputs to the inverter control unit 40 the frequency FR detected by the detection calculation unit 24 together with the derating signal DT. The recording unit 43 provided in the inverter control unit 40 records in the storage device 33 the frequency FR received when the derating signal DT is input from the comparison determination unit 25 or the temperature converted from the frequency FR.

Further, the recording unit 43 records in the storage device 33 the current value exhibited while the current value I output by the inverter circuit 31 is larger than the limiting value.

The detection value conversion unit 42 uses, for example, a frequency-temperature conversion table stored in advance in the storage device 33 so as to convert the frequency FR to the temperature.

The inverter control unit 40 changes any one or more of the amplitude, the frequency, and the phase of a current that is output from the inverter circuit 31 to be supplied to the armature, in accordance with the derating signal DT corresponding to an overload state signal from the detection processing device 20. For example, consideration is given to a case in which the detection processing device 20 detects that the temperature, which is obtained from a change in the resonance characteristic, has become equal to or higher than the set value, based on the detection result obtained by the detection apparatus 10. In this case, the inverter control unit 40 reduces the amplitude of the current caused to flow through the armature.

As described above, according to the rotating electric machine apparatus of the first embodiment, the limit of the physical quantity is detected with a simple configuration, and the current caused to flow through the armature is then operated based on the detection result, thereby being able to protect the rotating electric machine.

Second Embodiment

Figure 3:
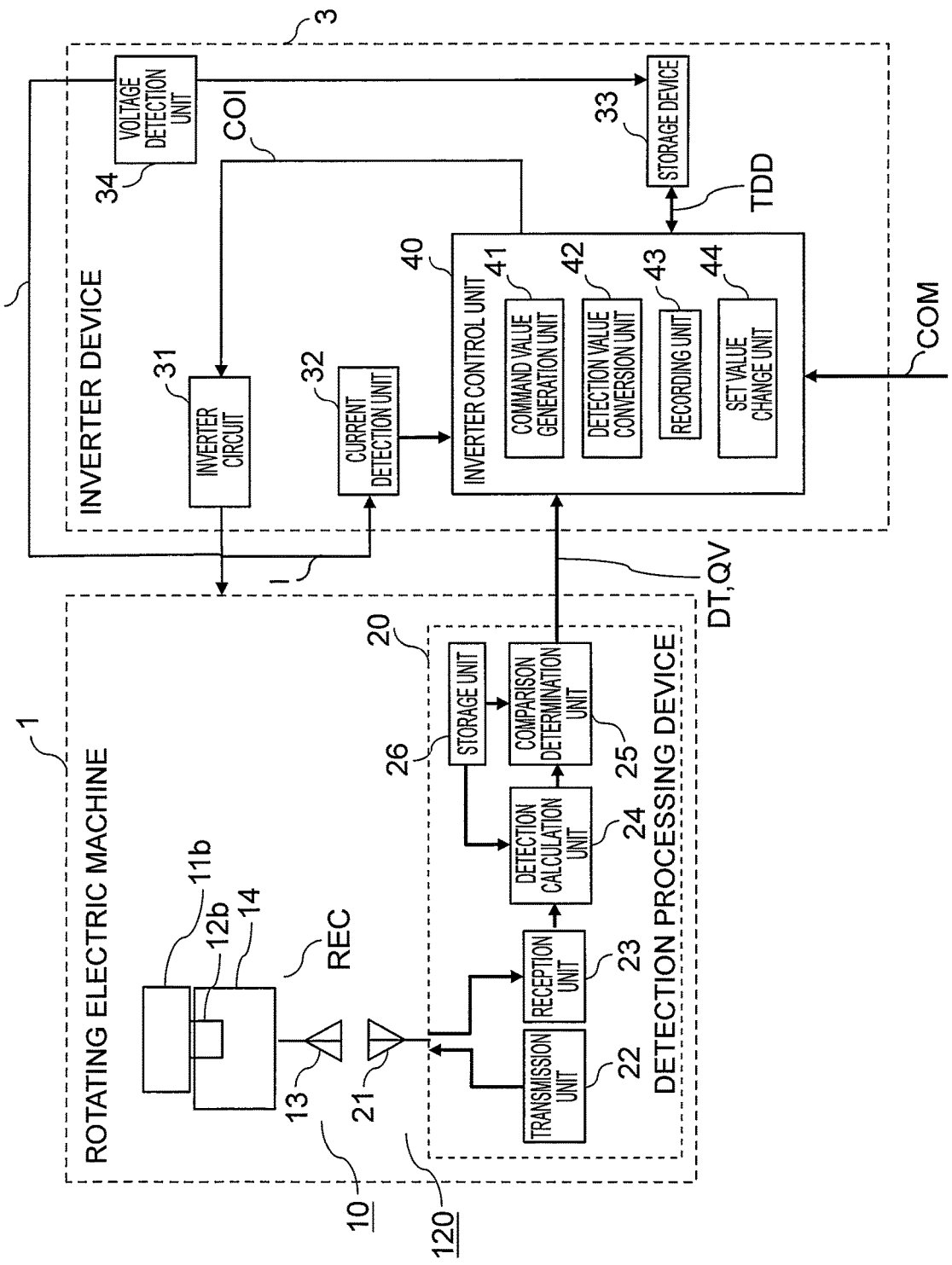
FIG. 3 is a block diagram for illustrating a schematic configuration of a rotating electric machine apparatus according to a second embodiment of the present invention.

FIG. 3 is a block diagram for illustrating a schematic configuration of a rotating electric machine apparatus according to a second embodiment of the present invention. In the embodiment illustrated in FIG. 3, the rotating electric machine 1 is, for example, an interior permanent magnet synchronous motor. The resonance circuit unit REC is formed of a thermistor 12b, which is the detection device, and a resonance circuit 14. The detection apparatus 10 is formed by connecting the thermistor 12b to the resonance circuit 14, and connecting the resonance circuit 14 to the first antenna 13 so as to be integrally provided.

The thermistor 12b, which is the detection device, measures a coil temperature of the armature of a stator of the interior permanent magnet synchronous motor. The thermistor 12b is mounted to the coil 11b of the armature of the stator, and a position of this mounting corresponds to a position indicated by reference numeral 10b of FIG. 2.

The detection apparatus 10 detects a change in the temperature of the coil 11b of the armature as a result of a change in the resonance characteristic of the resonance circuit 14, which is caused by a change in the resistance value of the thermistor 12b due to a temperature change.

Operations of the second antenna 21, the transmission unit 22, and the reception unit 23 in the detection processing device 20 provided on the stator side are the same as those in the first embodiment described above. The detection calculation unit 24 obtains the frequency of the response radio wave, and obtains the Q-value based on the expression given below.

$(Q\text{-value}) = \omega_0/(\omega_2 - \omega_1)$ $\omega_0$: Resonance frequency at resonance peak
$\omega_1$: Frequency at which vibrational energy is half of that at the resonance peak on left side of resonance peak
$\omega_2$: Frequency at which vibrational energy is half of that at the resonance peak on right side of resonance peak A set Q-value determined in advance is stored in the storage unit 26. The comparison determination unit 25 determines that the rotating electric machine 1 is in the abnormal state when the Q-value obtained as a value indicating the temperature of the coil 11b has become equal to or higher than the set Q-value determined in advance. Then, the comparison determination unit 25 outputs the derating signal DT indicating that the rotating electric machine 1 is in the abnormal state to the inverter control unit 40 included in the inverter device 3.

When the derating signal DT is input, the inverter control unit 40 changes the value of the current command COI so that the output current value I of the inverter circuit 31 detected by the current detection unit 32 is equal to or less than the limiting value.

The comparison determination unit 25 turns off the derating signal DT when the temperature of the coil 11b decreases, and the Q-value detected by the detection calculation unit 24 thus decreases to a value smaller than the set Q-value determined in advance.

The comparison determination unit 25 also outputs to the inverter control unit 40 the Q-value QV detected by the detection calculation unit 24 together with the derating signal DT. The recording unit 43 provided in the inverter control unit 40 records in the storage device 33 the Q-value received when the derating signal DT is input from the comparison determination unit 25 or the temperature converted from the Q-value.

Further, the recording unit 43 records in the storage device 33 the current value and a corresponding voltage value V of the output of the inverter circuit 31 obtained from the voltage detection unit 34 while the current value I output by the inverter circuit 31 is larger than the limiting value.

The detection value conversion unit 42 uses, for example, a Q-value-temperature conversion table stored in advance in the storage device 33 so as to convert the Q-value QV to the temperature.

The inverter control unit 40 changes any one of the amplitude, the frequency, and the phase of the current that is output from the inverter circuit 31 to be supplied to the armature, in accordance with the derating signal DT corresponding to the overload state signal from the detection processing device 20. For example, consideration is given to the case in which the detection processing device 20 detects that the temperature, which is obtained by a change in the resonance characteristic, has become equal to or higher than the set value, based on the detection result obtained by the detection apparatus 10. In this case, the inverter control unit 40 reduces the amplitude of the current caused to flow through the armature.

As described above, according to the rotating electric machine apparatus of the second embodiment, dielectric breakdown in the coil 11b can be avoided. Further, according to the rotating electric machine apparatus of the second embodiment, insulation of the detection apparatus 10 from an electric potential to earth potential is not required, and the temperature can thus accurately and quickly be measured.

Third Embodiment

Figure 4:
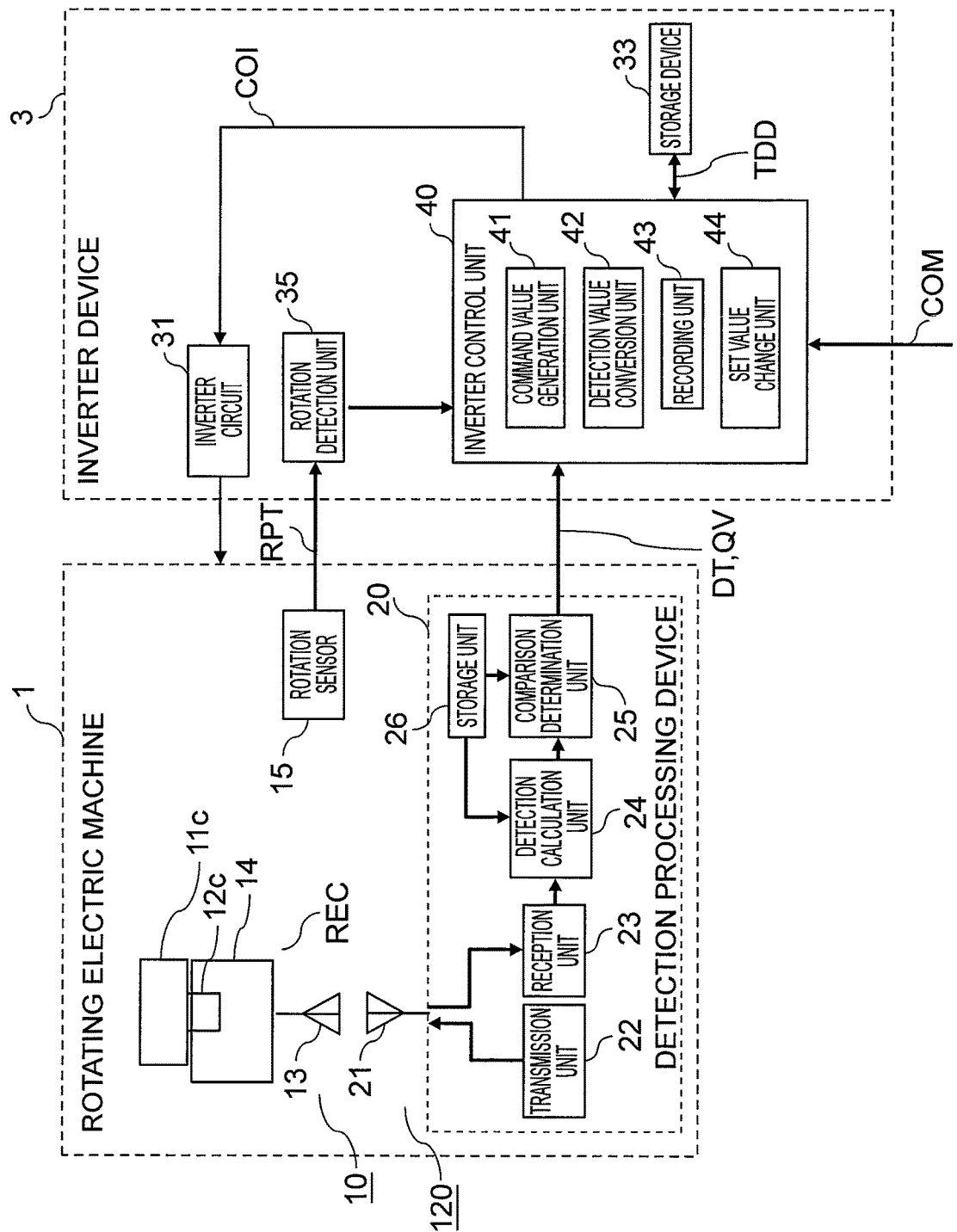
FIG. 4 is a block diagram for illustrating a schematic configuration of a rotating electric machine apparatus according to a third embodiment of the present invention.

FIG. 4 is a block diagram for illustrating a schematic configuration of a rotating electric machine apparatus according to a third embodiment of the present invention. In the embodiment illustrated in FIG. 4, the rotating electric machine 1 is, for example, an interior permanent magnet synchronous motor. The resonance circuit unit REC is formed of a strain gauge 12c, which is the detection device, and the resonance circuit 14. The detection apparatus 10 is formed by connecting the strain gauge 12c to the resonance circuit 14, and connecting the resonance circuit 14 to the first antenna 13 so as to be integrally provided.

The strain gauge 12c, which is the detection device, measures a stress, for example, in a core bridge portion of the rotor, which is a stress concentration portion of an iron core of the rotor. The strain gauge 12c is mounted to the core bridge portion 11c of the rotor, and a position of this mounting corresponds to a position indicated by reference numeral 10c of FIG. 2.

The detection apparatus 10 detects a stress or a strain in the core bridge portion 11c in accordance with a change in the resonance characteristic of the resonance circuit 14, which is caused by a change in a resistance value due to a change in a strain amount of the strain gauge 12c.

Operations of the second antenna 21, the transmission unit 22, and the reception unit 23 in the detection processing device 20 provided on the stator side are the same as those in the first and second embodiments described above. The detection calculation unit 24 obtains the frequency of the response radio wave and the Q-value.

A set Q-value determined in advance is stored in the storage unit 26. The comparison determination unit 25 determines that the rotating electric machine 1 is in the abnormal state when the Q-value obtained as a value indicating the stress of the core bridge portion 11c has become equal to or larger than the set Q-value determined in advance. Then, the comparison determination unit 25 outputs the derating signal DT indicating that the rotating electric machine 1 is in the abnormal state to the inverter control unit 40 included in the inverter device 3.

When the derating signal DT is input, the inverter control unit 40 changes the value of the current command COI so that the number of revolutions RPT detected by the rotation sensor 15 is equal to or less than the limiting value. Specifically, for example, the inverter control unit 40 outputs the current command COI for reducing the frequency of the current caused to flow through the armature. As a result, a breakdown of the iron core of the rotor can be avoided. The rotation sensor 15 is provided on the rotating electric machine 1 side so as to detect the number of revolutions of the rotor of the rotating electric machine 1.

The comparison determination unit 25 turns off the derating signal DT when the stress in the core bridge portion 11c decreases, and the Q-value detected by the detection calculation unit 24 thus decreases to a value smaller than the set Q-value determined in advance.

The comparison determination unit 25 also outputs to the inverter control unit 40 the Q-value QV detected by the detection calculation unit 24 together with the derating signal DT. The recording unit 43 provided in the inverter control unit 40 records in the storage device 33 the Q-value received when the derating signal DT is input from the comparison determination unit 25 or the stress converted from the Q-value with a temperature.

Further, the recording unit 43 records in the storage device 33 the number of revolutions exhibited while the number of revolutions RPT output by the rotation sensor 15 is larger than the limiting value.

The detection value conversion unit 42 uses, for example, a Q-value-stress conversion table stored in advance in the storage device 33 so as to convert the Q-value QV to the stress.

When the detected Q-value has become equal to or larger than the set Q-value determined in advance, that is, when the stress obtained from the change in the resonance characteristic has become equal to or larger than the set value in the comparison determination unit 25, the current command COI for reducing the frequency of the current caused to flow through the armature is output in the description given above. However, a current command COI for reducing the amplitude of the current caused to flow through the armature may be output.

As described above, according to the rotating electric machine apparatus of the third embodiment, the strain of the iron core is detected, to thereby check changes in gaps between the stator and the rotor and between magnet grooves of the rotor so as to change the amplitude of the current as required, thereby being able to maintain the torque.

Fourth Embodiment

Figure 5:
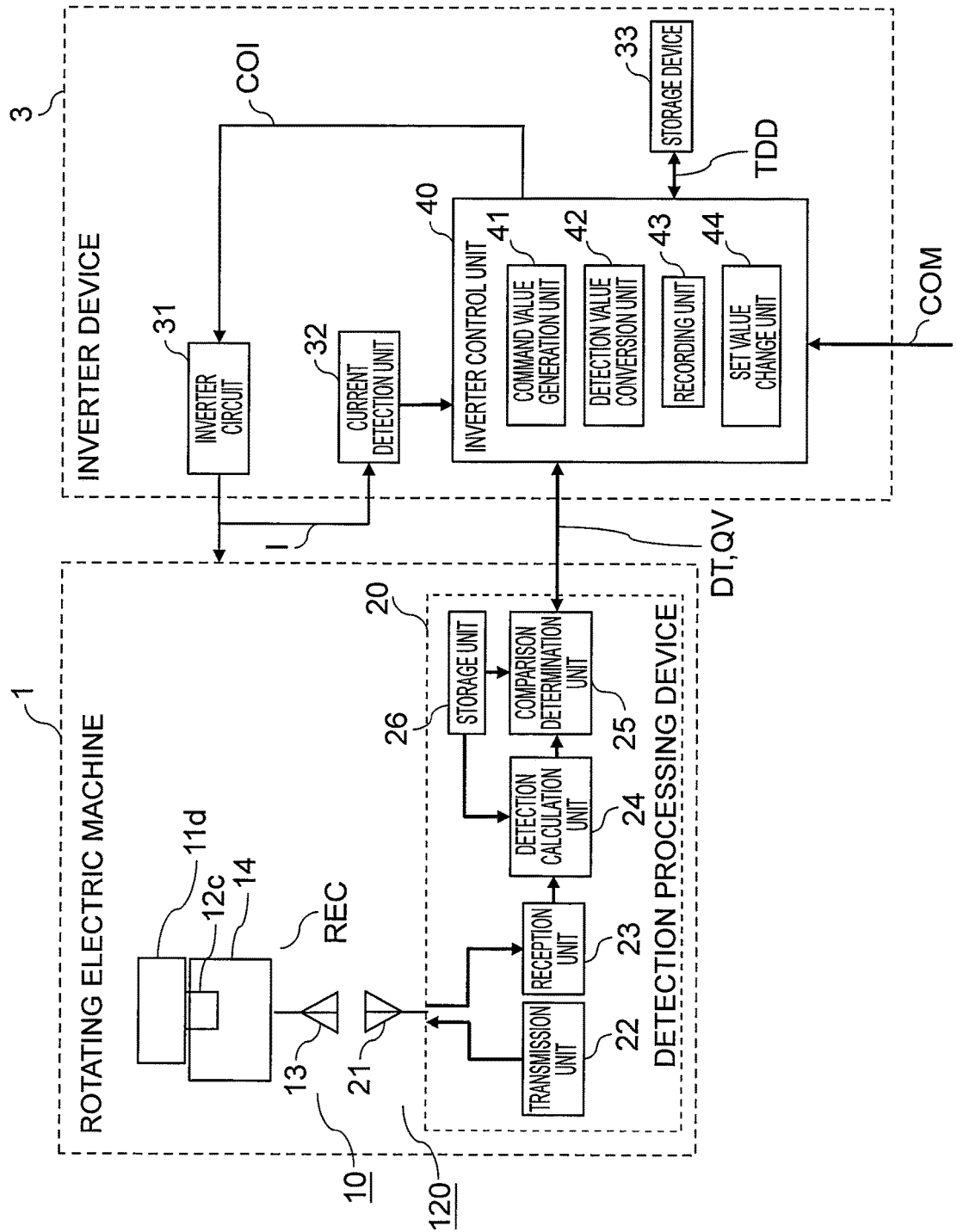
FIG. 5 is a block diagram for illustrating a schematic configuration of a rotating electric machine apparatus according to a fourth embodiment of the present invention.

FIG. 5 is a block diagram for illustrating a schematic configuration of a rotating electric machine apparatus according to a fourth embodiment of the present invention. In the embodiment illustrated in FIG. 5, the rotating electric machine 1 is, for example, an interior permanent magnet synchronous motor. The resonance circuit unit REC is formed of a strain gauge 12c, which is the detection device, and the resonance circuit 14. The detection apparatus 10 is formed by connecting the strain gauge 12c to the resonance circuit 14, and connecting the resonance circuit 14 to the first antenna 13 so as to be integrally provided.

The strain gauge 12c, which is the detection device, measures a stress, in particular, a torque, of the rotation shaft 101 of the rotating electric machine 1. The strain gauge 12c is mounted to the rotation shaft 101 of the rotor of the rotating electric machine 1, and a position of this mounting corresponds to a position indicated by reference numeral 10d of FIG. 2.

In FIG. 5, the rotation shaft 101 is indicated as the rotation shaft 11d. The detection apparatus 10 detects a strain, a stress, or a torque in the rotation shaft 11d in accordance with a change in the resonance characteristic of the resonance circuit 14, which is caused by a change in a resistance value due to a change in a strain amount of the strain gauge 12c.

Operations of the second antenna 21, the transmission unit 22, and the reception unit 23 in the detection processing device 20 provided on the stator side are the same as those in the first to third embodiments described above. The detection calculation unit 24 obtains the frequency of the response radio wave and the Q-value.

A set Q-value determined in advance is stored in the storage unit 26. The comparison determination unit 25 determines that the rotating electric machine 1 is in the abnormal state when the Q-value obtained as a value indicating the torque in the rotation shaft 11d has become equal to or larger than the set Q-value determined in advance. Then, the comparison determination unit 25 outputs the derating signal DT to the inverter control unit 40 included in the inverter device 3.

When the derating signal DT is input, the inverter control unit 40 changes the value of the current command COI so that the output current value I of the inverter circuit 31 detected by the current detection unit 32 is equal to or less than the limiting value. Specifically, for example, the inverter control unit 40 reduces the amplitude or the frequency of the current caused to flow through the armature. As a result, the input of an excessive torque can be avoided.

The comparison determination unit 25 turns off the derating signal DT when the torque in the rotation shaft 11d decreases, and the Q-value detected by the detection calculation unit 24 thus decreases to a value smaller than the set Q-value determined in advance.

The comparison determination unit 25 also outputs to the inverter control unit 40 the Q-value QV detected by the detection calculation unit 24 together with the derating signal DT. The recording unit 43 provided in the inverter control unit 40 records in the storage device 33 the Q-value received when the derating signal DT is input from the comparison determination unit 25 or the torque converted from the Q-value.

The detection value conversion unit 42 uses, for example, a Q-value-torque conversion table stored in advance in the storage device 33 so as to convert the Q-value QV to the torque.

Moreover, the set value change unit 44 included in the inverter control unit 40 counts the number of times that the torque in the rotation shaft 11d, namely, the stress in the rotation shaft 11d, has become equal to or larger than the set value. Then, when the count exceeds a set number of times, the set value change unit 44 updates the set value for the torque stored in the storage unit 26 included in the detection processing device 20 to a smaller value.

As described above, the rotating electric machine apparatus according to the fourth embodiment counts the number of times that the stress has exceeded the set value, to thereby be able to execute the control in consideration of the frequency of the excessive load. This function implemented by the set value change unit 44 can be applied to each of the embodiments.

Fifth Embodiment

Figure 6:
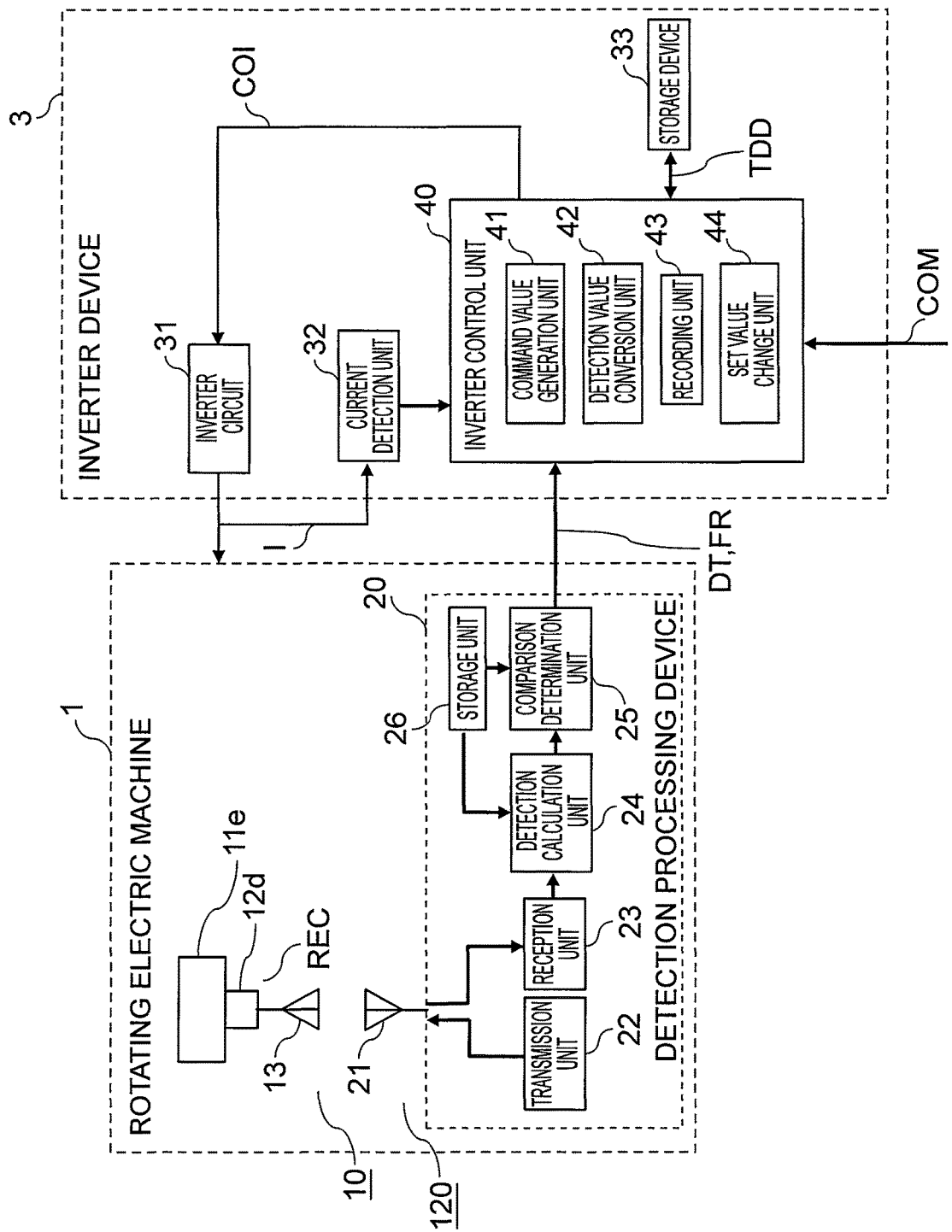
FIG. 6 is a block diagram for illustrating a schematic configuration of a rotating electric machine apparatus according to a fifth embodiment of the present invention.

FIG. 6 is a block diagram for illustrating a schematic configuration of a rotating electric machine apparatus according to a fifth embodiment of the present invention. In the embodiment illustrated in FIG. 6, the rotating electric machine 1 is, for example, an interior permanent magnet synchronous motor. The resonance circuit unit REC is formed of an acceleration sensor 12d, which is the detection device. The acceleration sensor 12d internally includes a resonance circuit, to thereby form the resonance circuit unit REC. The acceleration sensor 12d is connected to and provided integrally with the first antenna 13, to thereby form the detection apparatus 10.

The acceleration sensor 12d, which is the detection device, measures an acceleration of a frame 11e of the rotating electric machine 1. The acceleration sensor 12d is mounted to the frame 104 of the rotating electric machine 1, and a position of this mounting corresponds to a position indicated by reference numeral 10e of FIG. 2.

In FIG. 6, the frame 104 is indicated as the frame 11e. The detection apparatus 10 detects the acceleration of the frame 11e in accordance with a change in the resonance characteristic, which is caused by a change in a capacitance or a resistance value of the acceleration sensor 12d. Through the detection of a vibration, noise can be reduced, and a breakdown by excitation can be avoided.

Operations of the second antenna 21, the transmission unit 22, and the reception unit 23 in the detection processing device 20 provided on the stator side are the same as those in the first to fourth embodiments described above. The detection calculation unit 24 obtains the frequency of the response radio wave indicating a change in the acceleration of the frame 11e.

A set frequency value determined in advance is stored in the storage unit 26. The comparison determination unit 25 determines that the rotating electric machine 1 is in the abnormal state when the frequency value obtained as a value indicating the vibration of the frame 11e has become larger than a set frequency value determined in advance. Then, the comparison determination unit 25 outputs the derating signal DT to the inverter control unit 40 included in the inverter device 3.

When the derating signal DT is input, the inverter control unit 40 changes the value of the current command COI so that the output current value I of the inverter circuit 31 detected by the current detection unit 32 is equal to or less than the limiting value. Specifically, for example, the inverter control unit 40 reduces the amplitude or the frequency of the current caused to flow through the armature. As a result, the vibration of the frame 11e can be reduced, and the noise can be reduced, thereby being able to avoid the breakdown by the excitation.

The comparison determination unit 25 turns off the derating signal DT when the vibration of the frame 11e decreases, and the Q-value detected by the detection calculation unit 24 thus decreases to a value smaller than the set Q-value determined in advance.

The comparison determination unit 25 also outputs to the inverter control unit 40 the frequency FR detected by the detection calculation unit 24 together with the derating signal DT. The recording unit 43 provided in the inverter control unit 40 records in the storage device 33 the frequency received when the derating signal DT is input from the comparison determination unit 25 or the acceleration converted from the frequency.

The detection value conversion unit 42 uses, for example, a frequency-acceleration conversion table stored in advance in the storage device 33 so as to convert the frequency FR to the acceleration.

Sixth Embodiment

Figure 7:
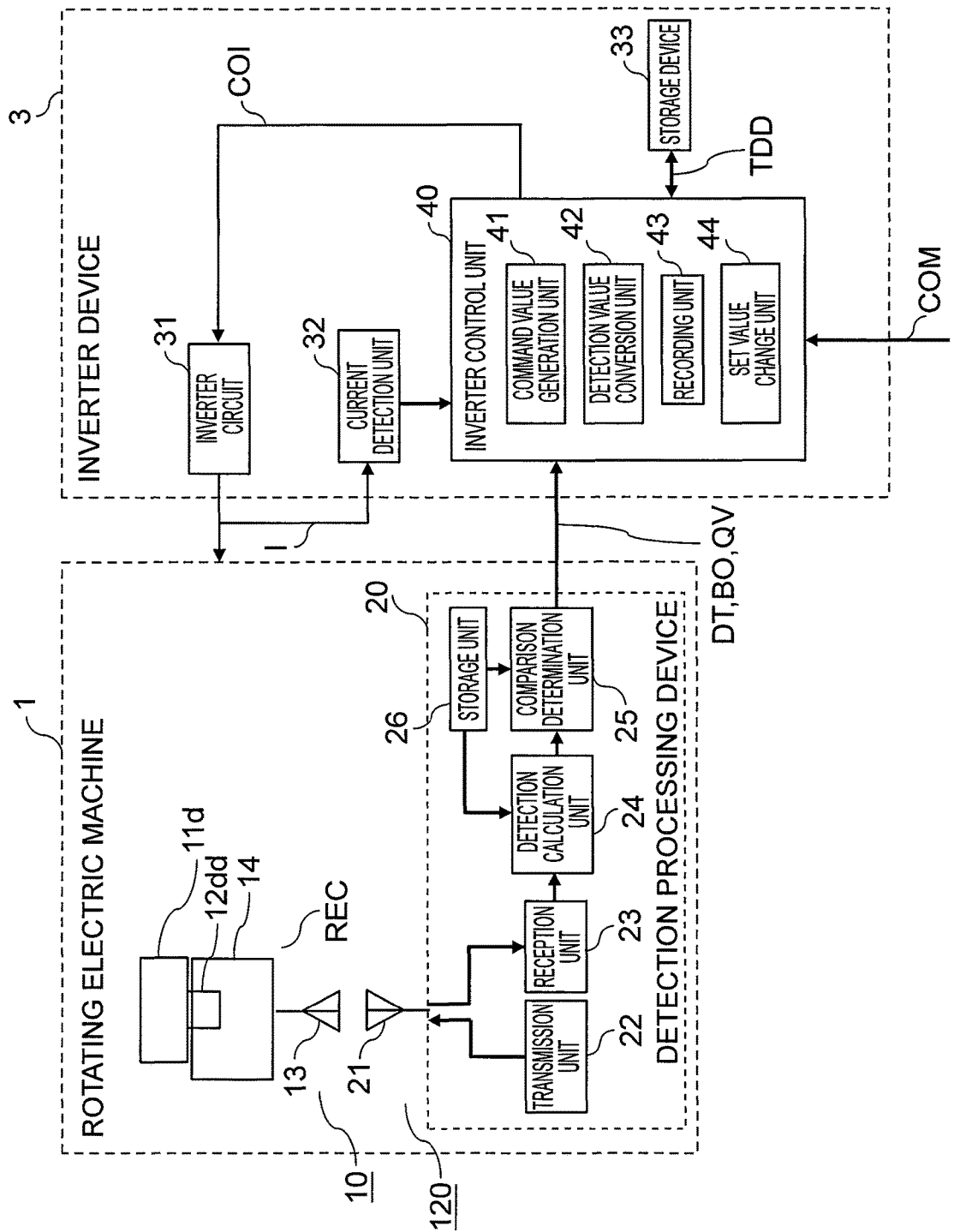
FIG. 7 is a block diagram for illustrating a schematic configuration of a rotating electric machine apparatus according to a sixth embodiment of the present invention.

FIG. 7 is a block diagram for illustrating a schematic configuration of a rotating electric machine apparatus according to a sixth embodiment of the present invention. In the embodiment illustrated in FIG. 7, the rotating electric machine 1 is, for example, an interior permanent magnet synchronous motor. The resonance circuit unit REC is formed of an acceleration sensor 12dd of a resistance change type, which is the detection device, and the resonance circuit 14. The detection apparatus 10 is formed by connecting the acceleration sensor 12dd to the resonance circuit 14, and connecting the resonance circuit 14 to the first antenna 13 so as to be integrally provided.

The acceleration sensor 12dd, which is the detection device, measures a vibration, in particular, resonance, of the rotation shaft 101 of the rotating electric machine 1 as the acceleration. The acceleration sensor 12dd is mounted to the rotation shaft 101 of the rotor of the rotating electric machine 1, and a position of this mounting corresponds to a position indicated by reference numeral 10d of FIG. 2.

In FIG. 7, the rotation shaft 101 is indicated as the rotation shaft 11d. The acceleration sensor 12dd may be provided on the rotor vibrating together with the rotation shaft 101, in place of the rotation shaft 101.

Operations of the second antenna 21, the transmission unit 22, and the reception unit 23 in the detection processing device 20 provided on the stator side are the same as those in the first to fifth embodiments described above. The detection calculation unit 24 obtains the frequency of the response radio wave, and the Q-value.

A set Q-value determined in advance is stored in the storage unit 26. The comparison determination unit 25 determines that the rotating electric machine 1 is in the abnormal state when the Q-value obtained as a value indicating the vibration and the resonance of the rotation shaft 11d has become equal to or larger than the set Q-value determined in advance. Then, the comparison determination unit 25 outputs the derating signal DT to the inverter control unit 40 included in the inverter device 3.

When the derating signal DT is input, the inverter control unit 40 changes the value of the current command COI so that the output current value I of the inverter circuit 31 detected by the current detection unit 32 is equal to or less than the limiting value. Specifically, for example, the inverter control unit 40 reduces the frequency or the amplitude of the current caused to flow through the armature. As a result, a dangerous rotation speed of a shaft resonance can be avoided. A vibration in an axial direction and a swing in a radial direction change as a result of recognition of a behavior of the rotor.

In place of the derating signal DT, the comparison determination unit 25 may output a boost signal BO to the inverter control unit 40. When the boost signal BO is input, the inverter control unit 40 changes, for example, the value of the current command COI so as to increase the current value or the amplitude so that the output current value I of the inverter circuit 31 is a value increased by a default value defined in advance. The behavior of the rotor can be changed also by increasing the current value, which is the output of the inverter circuit 31.

The derating signal DT and the boost signal BO are considered as abnormality indication signals.

The comparison determination unit 25 turns off the derating signal DT or the boost signal BO when the vibration and the resonance of the rotation shaft 11d decrease, and the Q-value detected by the detection calculation unit 24 thus decreases to a value smaller than the set Q-value determined in advance.

The comparison determination unit 25 also outputs to the inverter control unit 40 the Q-value QV detected by the detection calculation unit 24 together with the derating signal DT or the boost signal BO. The recording unit 43 provided in the inverter control unit 40 records in the storage device 33 the Q-value received when the derating signal DT or the boost signal BO is input from the comparison determination unit 25 or the acceleration converted from the Q-value.

The detection value conversion unit 42 uses, for example, a Q-value-acceleration conversion table stored in advance in the storage device 33 so as to convert the Q-value QV to the acceleration.

Seventh Embodiment

Figure 8:
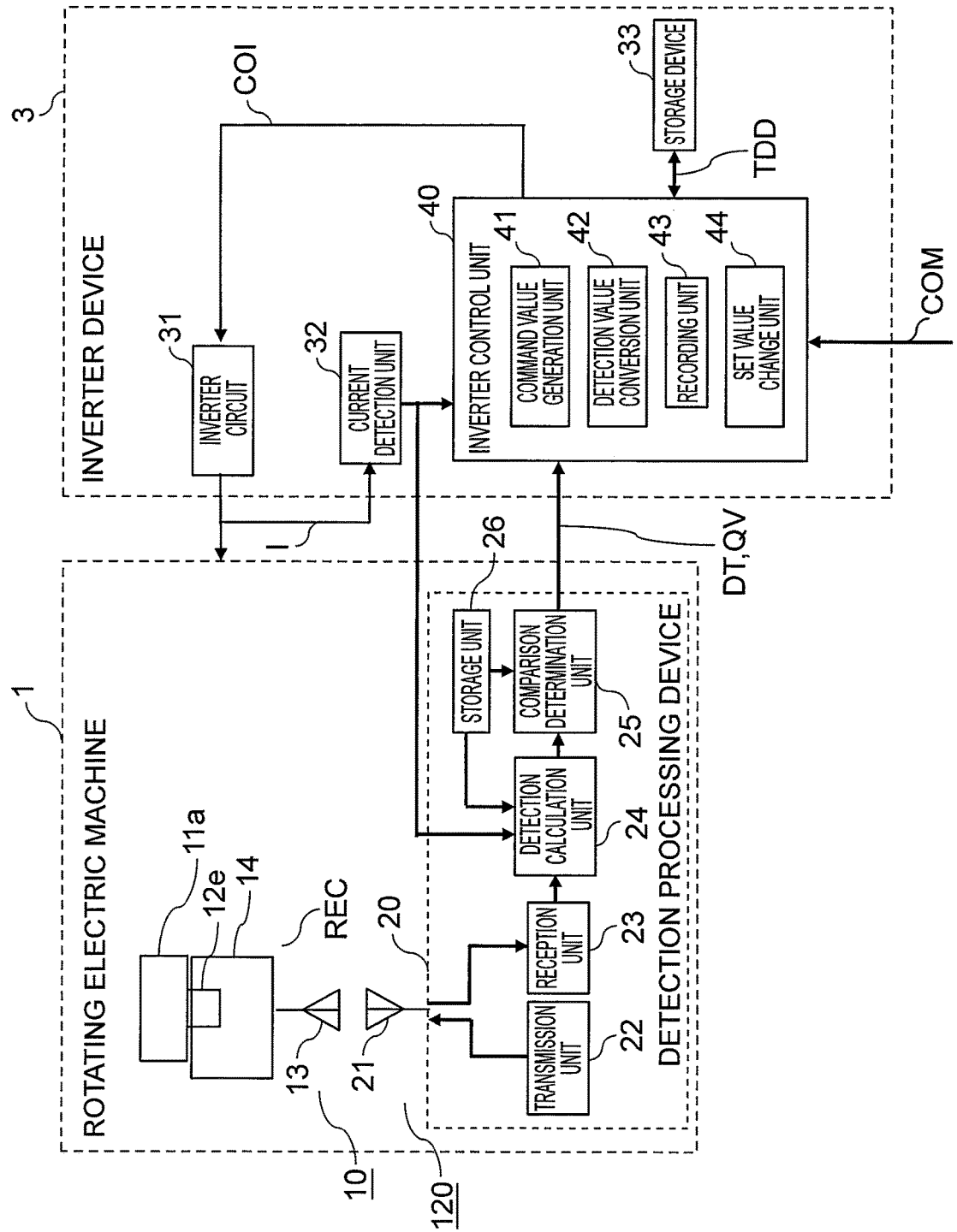
FIG. 8 is a block diagram for illustrating a schematic configuration of a rotating electric machine apparatus according to a seventh embodiment of the present invention.

FIG. 8 is a block diagram for illustrating a schematic configuration of a rotating electric machine apparatus according to a seventh embodiment of the present invention. In the embodiment illustrated in FIG. 8, the rotating electric machine 1 is, for example, an interior permanent magnet synchronous motor. The resonance circuit unit REC is formed of a magnetoelectric conversion element 12e, which is the detection device, and the resonance circuit 14. The detection apparatus 10 is formed by connecting the magnetoelectric conversion element 12e to the resonance circuit 14, and connecting the resonance circuit 14 to the first antenna 13 so as to be integrally provided. The magnetoelectric conversion element 12e is, for example, a Hall element, a tunnel magnetoresistance (TMR) element, or a giant magnetoresistance (GMR) element.

The magnetoelectric conversion element 12e, which is the detection device, measures a composite value of a magnetic field generated by the magnet 11a (field) of the interior permanent magnet synchronous motor and a magnetic field generated by the coil (armature). The magnetoelectric conversion element 12e is mounted to the magnet of the rotor of the rotating electric machine 1, and a position of this mounting corresponds to the position indicated by reference numeral 10a of FIG. 2. The coil (armature) corresponds to, for example, portions indicated by reference numeral 105 of FIG. 2 in four directions on the outer stator side.

The detection apparatus 10 detects a magnetic flux density in accordance with a change in the resonance characteristic of the resonance circuit 14, which is caused by a change in a resistance value of the magnetoelectric conversion element 12e. In more detail, the magnetoelectric conversion element 12e is called "Hall element", and generates a voltage when a magnetic field is applied thereto. Thus, the resistance value of the magnetoelectric conversion element 12e relatively decreases when the magnetic field is applied.

Operations of the second antenna 21, the transmission unit 22, and the reception unit 23 in the detection processing device 20 provided on the stator side are the same as those in each of the first to sixth embodiments described above. The detection calculation unit 24 obtains a frequency and the Q-value indicating the change in the detected magnetic field. The detection calculation unit 24 further calculates a magnetic field formed by the coil (armature) from the flowing current detected by the current detection unit 32. In this case, a table indicating a relationship between the flowing current detected by the current detection unit 32 and the magnetic field formed by the coil (armature) may be stored in the storage unit 26, and the detection calculation unit 24 may use the table to obtain the magnetic field. Then, the detection calculation unit 24 estimates the magnetic field of the magnet (field) based on the magnetic field formed by the coil (armature). Then, the detection calculation unit 24 obtains a threshold value of the Q-value corresponding to the estimated magnetic field of the magnet (field).

The comparison determination unit 25 determines that the rotating electric machine 1 is in the abnormal state when the Q-value obtained as a value indicating a magnetic force of the detected magnetic field becomes equal to or less than the threshold value of the Q-value. Then, the comparison determination unit 25 outputs the derating signal DT to the inverter control unit 40 included in the inverter apparatus 3.

When the derating signal DT is input, the inverter control unit 40 changes the value of the current command COI so that the output current value I of the inverter circuit 31 detected by the current detection unit 32 is equal to or less than the limiting value. Specifically, for example, the inverter control unit 40 outputs the current command COI for reducing the amplitude of the current to be caused to flow through the armature or for reducing a current phase so as to be equal to or smaller than a default value. As a result, for example, a demagnetization in the magnet can be avoided.

The comparison determination unit 25 turns off the derating signal DT when the detected magnetic field increases, and the Q-value detected by the detection calculation unit 24 thus exceeds the set Q-value.

The comparison determination unit 25 also outputs to the inverter control unit 40 the Q-value QV detected by the detection calculation unit 24 together with the derating signal DT. The recording unit 43 provided in the inverter control unit 40 records in the storage device 33 the Q-value received when the derating signal DT is input from the comparison determination unit 25 or the magnetic field density converted from the Q-value.

The detection value conversion unit 42 uses, for example, a Q-value-magnetic field density conversion table stored in advance in the storage device 33 so as to convert the Q-value QV to the magnetic field density.

Figure 9:
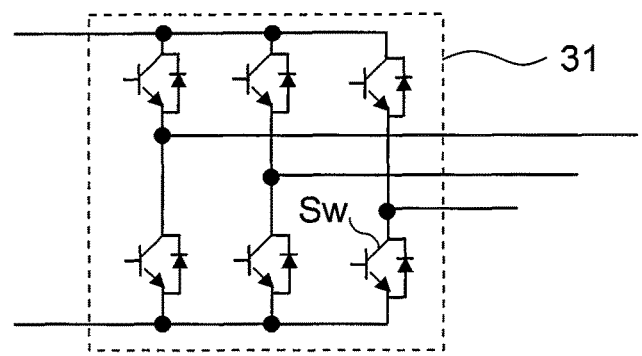
FIG. 9 is a diagram for illustrating an example of a circuit configuration of an inverter circuit of the rotating electric machine apparatus according to the present invention.

A description has been given of each of the embodiments, but the rotating electric machine 1 may be a motor or a generator. Moreover, a description has been given of the example in which the rotating electric machine 1 is an interior permanent magnet synchronous motor, but the rotating electric machine 1 may also be an induction motor, a synchronous reluctance motor, a switched reluctance motor, or the like. In each of the embodiments, the rotating electric machine 1 is supplied with power or regenerates power through use of the inverter circuit 31. Moreover, for example, switching elements Sw of the inverter circuit 31 including a bridge circuit exemplified in FIG. 9 may be formed of self-extinguishing semiconductor switching elements. Moreover, the resonance frequency of the resonance circuit unit RES may be set to be higher than the carrier frequency in the inverter apparatus 3. As a result, an erroneous operation and superposition of noise caused by carrier noise can be avoided.

Moreover, the resonance frequency of the resonance circuit unit RES can be set to a frequency higher than a multiple of the number of pole pairs of a rotational frequency at the maximum number of revolutions of the rotating electric machine 1. As a result, an erroneous operation and superposition of noise caused by the magnetic flux of the armature can be avoided.

Moreover, the recording unit 43 included in the inverter control unit 40 may store in the storage device 33 the number of times that the detection processing device 20 has determined that the physical quantity detected by the detection apparatus 10 is equal to or more than the set value. As a result, the overload state of the respective portions of the rotating electric machine 1 can be recorded, and reinforcement and replacement of components can appropriately be executed in accordance with the data in the storage device 33 during maintenance, thereby being able to maintain the apparatus.

Moreover, in each of the embodiments, portions of the detection calculation unit 24, the comparison determination unit 25, and the storage unit 26 in the detection processing device 20 of the rotating electric machine 1 and portions of the inverter control unit 40 and the storage device 33 in the inverter apparatus 3 are constructed by computers or digital circuits.

Regarding this point, each of the processing circuits for implementing those functions may be constructed by a central processing unit (CPU, which is also referred to as "processing unit", "arithmetic unit", "microprocessor", "microcomputer", "processor", or "DSP") for executing a program stored in a memory.

Figure 10:
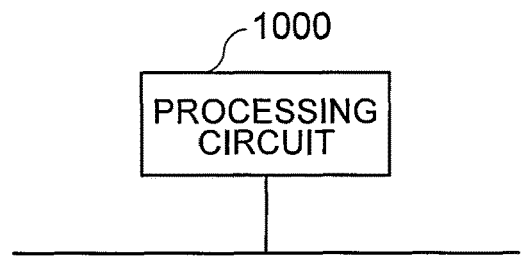
FIG. 10 is a diagram for illustrating an example of a hardware configuration in a case in which a control unit of the rotating electric machine apparatus according to the present invention is constructed by hardware.
Figure 11:
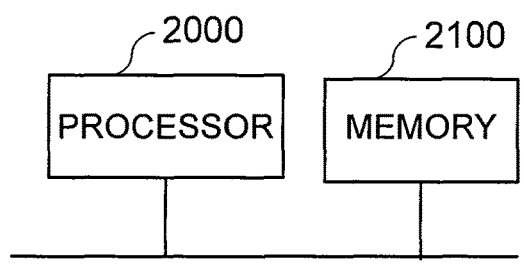
FIG. 11 is a diagram for illustrating an example of a hardware configuration in a case in which the control unit of the rotating electric machine apparatus according to the present invention is constructed by software.

FIG. 10 and FIG. 11 are diagrams for schematically illustrating hardware configurations in a case in which those functions are constructed by hardware and a case in which those functions are constructed by software, respectively. When the functions of the above-mentioned respective components are constructed by hardware illustrated in FIG. 10, a processing circuit 1000 corresponds to, for example, a single circuit, a complex circuit, a programmed processor, a processor for a parallel program, an ASIC, an FPGA, or a combination thereof. The function of each component described above may be implemented by a processing circuit, or the functions of the respective components may altogether be implemented by a processing circuit.

When the functions of the above-mentioned respective components are constructed by a CPU illustrated in FIG. 11, the functions of the respective components are implemented by software, firmware, or a combination of software and firmware. The software, the firmware, or the like are described as programs, and are stored in a memory 2100. A processor 2000, which is a processing circuit, reads out and executes the programs stored in the memory 2100, to thereby implement the functions of the respective components.

Those programs may be considered as programs for causing a computer to execute the procedures and the methods of the respective components. In this case, the memory 2100 corresponds to, for example, a nonvolatile or volatile semiconductor memory such as a RAM, a ROM, a flash memory, an EPROM, or an EEPROM, or to a magnetic disk, a flexible disk, an optical disc, a compact disc, a MiniDisc, or a DVD.

The functions of the respective components may be implemented partially by dedicated hardware, and partially by software or firmware.

In this manner, the processing circuit can implement each of the above-mentioned functions by hardware, software, firmware, or a combination thereof. Moreover, various types of information required for the processing are set to the circuit in advance in the case of the hardware configuration, and are stored in the memory in advance in the case of the software configuration.

The present invention is not limited to each of the above-mentioned embodiments, and includes all possible combinations of those embodiments.

REFERENCE SIGNS LIST 1 rotating electric machine, 3 inverter device, 10 detection apparatus, 11 portion to be measured, 11a magnet, 11b coil, 11c core bridge portion, 11d rotation shaft, 11e frame, 12a crystal oscillator (detection device), 12b thermistor, 12c strain gauge, 12d, 12dd acceleration sensor, 12e magneto-electric conversion element, 13 first antenna, 14 resonance circuit, 15 rotation sensor, 20 detection processing device, 21 second antenna, 22 transmission unit, 23 reception unit, 24 detection calculation unit, 25 comparison determination unit, 26 storage unit, 31 inverter circuit, 32 current detection unit, 33 storage device, 34 voltage detection unit, 40 inverter control unit, 41 command value generation unit, 42 detection value conversion unit, 43 recording unit, 44 set value change unit, 101 rotation shaft, 102 inner cylindrical member, 103 outer cylindrical member, 104 frame, 120 physical quantity detection apparatus

The invention claimed is:

1. A rotating electric machine apparatus, comprising:
a rotating electric machine including a rotor and a stator provided concentrically about a rotation shaft as an axis, one of the rotor and the stator being provided outside another thereof, the rotor being rotatable about the rotating shaft as the axis, the stator being fixed, any one of the rotor and the stator including an armature, another thereof including a field;
an inverter including an inverter circuit to drive the rotating electric machine, and an inverter controller to control the inverter circuit;
a detector including a resonance circuitry, which is mounted to an object to be measured of the rotating electric machine and has a resonance characteristic that changes depending on a change in a physical quantity of the object to be measured, and a first antenna to transmit the resonance characteristic; and
a detection processor to receive the resonance characteristic dependent on the change in the physical quantity in a form of a response radio wave from the first antenna as a response to a transmission radio wave transmitted from a second antenna, calculate a detection result corresponding to a current value of the physical quantity from the resonance characteristic, and compare whether the detection result is within a permissible range set in advance, to thereby detect whether the object to be measured is in an abnormal state,
wherein the inverter controller controls output of the inverter circuit so that the detection result falls within the permissible range when the inverter controller receives from the detection processor an abnormal state signal indicating that the abnormal state is detected.

2. The rotating electric machine apparatus according to claim 1, wherein the inverter controller changes any one or more of an amplitude, a frequency, and a phase of a current to be caused to flow through the armature, in accordance with the abnormal state signal received from the detection processor.

3. The rotating electric machine apparatus according to claim 1,
wherein the inverter circuit includes a self-extinguishing semiconductor switching element,
wherein the rotating electric machine receives power or regenerates power through use of the inverter circuit, and
wherein a resonance frequency of the resonance circuitry is higher than a carrier frequency in the inverter.

4. The rotating electric machine apparatus according to claim 1, wherein a resonance frequency of the resonance circuitry is higher than a multiple of a number of pole pairs of a rotational frequency at a maximum number of revolutions of the rotating electric machine.

5. The rotating electric machine apparatus according to claim 1,
wherein the resonance circuitry includes a crystal oscillator, which is a detection element, and
wherein the detector detects a change in a temperature or a stress of the rotating electric machine in accordance with a change in a resonance frequency, which is caused by a change in a temperature or a stress of the crystal oscillator.

6. The rotating electric machine apparatus according to claim 5,
wherein the detection element is mounted to a magnet of the field installed on the rotor of the rotating electric machine, and
wherein when the detection processor detects, from a detection result obtained by the detector, that a temperature acquired from a change in the resonance characteristic has become equal to or higher than a set value, the inverter controller reduces an amplitude of a current to be caused to flow through the armature.

7. The rotating electric machine apparatus according to claim 5,
wherein the detection element is mounted to a coil of the armature of the rotating electric machine, and
wherein when the detection processor detects, from a detection result obtained by the detector, that a temperature acquired from a change in the resonance characteristic has become equal to or higher than a set value, the inverter controller reduces an amplitude of a current to be caused to flow through the armature.

8. The rotating electric machine apparatus according to claim 1,
wherein the resonance circuitry includes a thermistor, which is a detection element, and a resonance circuit connected to the thermistor, and
wherein the detector detects a change in a temperature in accordance with a change in a resonance characteristic of the resonance circuit, which is caused by a change in a resistance value as a result of a change in a temperature of the thermistor.

9. The rotating electric machine apparatus according to claim 1,
wherein the resonance circuitry of the detector includes a strain gauge, which is a detection element, and a resonance circuit connected to the strain gauge, and
wherein the detector detects a stress or a torque in accordance with a change in the resonance characteristic of the resonance circuit, which is caused by a change in a resistance value as a result of a change in a strain amount of the strain gauge.

10. The rotating electric machine apparatus according to claim 9,
wherein the strain gauge is mounted to a stress concentration portion of an iron core of the rotor of the rotating electric machine, and
wherein when the detection processor detects, from a detection result obtained by the detector, that a stress acquired from a change in the resonance characteristic has become equal to or larger than a set value, the inverter controller reduces an amplitude or a frequency of a current to be caused to flow through the armature.

11. The rotating electric machine apparatus according to claim 9,
wherein the strain gauge is mounted to a stress concentration portion of an iron core of the rotor of the rotating electric machine, and
wherein when the detection processor detects, from a detection result obtained by the detector, that a stress acquired from a change in the resonance characteristic has become equal to or larger than a set value, the inverter controller increases an amplitude of a current to be caused to flow through the armature.

12. The rotating electric machine apparatus according to claim 9, wherein the inverter controller counts a number of times that the stress has become equal to or larger than a set value, and updates the set value for the stress to a smaller value when the number of times has exceeded a set number of times.

13. The rotating electric machine apparatus according to claim 9,
wherein the strain gauge is mounted to the rotation shaft of the rotor of the rotating electric machine, and
wherein when the detection processor detects, from a detection result obtained by the detector, that a torque acquired from a change in the resonance characteristic has become equal to or larger than a set value, the inverter controller reduces an amplitude of a current to be caused to flow through the armature.

14. The rotating electric machine apparatus according to claim 1,
wherein the resonance circuitry includes an acceleration sensor, which is a detection element, and
wherein the detector detects an acceleration in accordance with a change in the resonance characteristic, which is caused by a change in a capacitance or a resistance value of the acceleration sensor.

15. The rotating electric machine apparatus according to claim 14,
wherein the acceleration sensor is mounted to a frame of the stator, and
wherein when the detection processor detects, from a detection result obtained by the detector, that an acceleration acquired from a change in the resonance characteristic has become equal to or larger than a set value, the inverter controller reduces an amplitude of a current to be caused to flow through the armature.

16. The rotating electric machine apparatus according to claim 14,
wherein the acceleration sensor is mounted to the rotor or the rotation shaft of the rotating electric machine, and
wherein when the detection processor detects, from a detection result obtained by the detector, that an acceleration acquired from a change in the resonance characteristic has become equal to or larger than a set value, the inverter controller increases or reduces an amplitude or a frequency of a current to be caused to flow through the armature.

17. The rotating electric machine apparatus according to claim 1,
wherein the resonance circuitry includes a magnetoelectric conversion element, which is a detection element, and a resonance circuit connected to the magnetoelectric conversion element, and
wherein the detector detects a magnetic flux density in accordance with a change in the resonance characteristic of the resonance circuitry, which is caused by a change in a resistance value of the magnetoelectric conversion element.

18. The rotating electric machine apparatus according to claim 17,
wherein the magnetoelectric conversion element is mounted to a magnet installed on the rotor, and
wherein when the detection processor detects, from a detection result obtained by the detector, that a magnetic flux density acquired from a change in the resonance characteristic has become equal to or smaller than a set value, the inverter controller reduces an amplitude of a current to be caused to flow through the armature.

19. The rotating electric machine apparatus according to claim 1, wherein the inverter controller stores in a specific memory a number of times that the detection processor has determined that the physical quantity detected by the detector is equal to or more than a set value.

20. A control method for a rotating electric machine, which is executed by the rotating electric machine apparatus of claim 1, comprising:
transmitting the transmission radio wave through the second antenna;
transmitting the resonance characteristic as a response to the transmission radio wave in a form of a response radio wave through the first antenna, when the transmission radio wave is received through the first antenna;
calculating a detection result corresponding to a current value of the physical quantity from the resonance characteristic, when the response radio wave is received through the second antenna;
comparing whether the detection result is within a permissible range set in advance, to thereby detect whether the object to be measured is in an abnormal state;

outputting the abnormal state signal to the inverter controller when the abnormal state is detected in the comparing; and controlling output of the inverter circuit so that the detection result falls within the permissible range when the inverter controller receives the abnormal state signal.

\* \* \* \* \*